United States Patent
Levy et al.

(10) Patent No.: US 9,948,435 B2
(45) Date of Patent: Apr. 17, 2018

(54) SEAMLESS MATCH POINT SWITCHING IN MLSE-BASED MODEMS

(71) Applicant: MULTIPHY LTD., Ness-Ziona (IL)

(72) Inventors: Omri Levy, Rehovot (IL); Hanan Leizerovich, Petach Tikva (IL); Yaron Bebes, Petach Tikva (IL); Nir Sheffi, Rehovot (IL)

(73) Assignee: MULTIPHY LTD., Ness-Ziona (IL)

(*) Notice: Subject to any disclaimer, the term of this patent is extended or adjusted under 35 U.S.C. 154(b) by 0 days.

(21) Appl. No.: 15/213,809

(22) Filed: Jul. 19, 2016

(65) Prior Publication Data
US 2017/0026284 A1    Jan. 26, 2017

Related U.S. Application Data

(60) Provisional application No. 62/194,365, filed on Jul. 20, 2015.

(51) Int. Cl.
*H04B 1/00* (2006.01)
*H04L 1/20* (2006.01)
*H04L 5/00* (2006.01)
*H04L 25/03* (2006.01)

(52) U.S. Cl.
CPC .............. *H04L 1/203* (2013.01); *H04L 5/006* (2013.01); *H04L 25/03178* (2013.01)

(58) Field of Classification Search
CPC ............ H04B 1/70753; H04B 1/70755; H04B 1/708; H04L 1/0054

USPC .......................................... 375/147; 370/465
See application file for complete search history.

(56) References Cited

U.S. PATENT DOCUMENTS

| | | | |
|---|---|---|---|
| 6,335,954 B1* | 1/2002 | Bottomley | H04B 7/0845 375/267 |
| 2013/0264881 A1* | 10/2013 | Roeper | H04L 7/02 307/77 |

* cited by examiner

*Primary Examiner* — Leila Malek
(74) *Attorney, Agent, or Firm* — FisherBroyles, LLP; Robert Kinberg

(57) ABSTRACT

Method and system for providing seamless match point switching in an adaptive decoder (e.g., an MLSE decoder) that is based on estimation of symbol sequences, according to which statistics regarding samples corresponding to different symbol sequences in alternative match points are collected by a statistics collector, to create a set of figures of merit representing the quality of each alternative match point, while different match points are obtained by changing the delay of symbols decoded by the adaptive decoder and samples entering the statistics collector. A figure of merit of the current match point is compared to the figure of merit of alternative match points. Whenever an alternative match point figure of merit is better than the current match point by a predefined threshold, a decision to switch to the alternative match point is made. Seamless switching to the alternative match point is performed by shifting the sampling phase forward or backward, until obtaining better performance, while performing adaptation of the decoder to the sampling phase shift.

15 Claims, 2 Drawing Sheets

SEAMLESS MATCH POINT SWITCHING IN MLSE-BASED MODEMS

CROSS-REFERENCE TO RELATED APPLICATION

This application claims the benefit of U.S. Provisional Application No. 62/194,365, filed Jul. 20, 2015, the disclosure of which is incorporated herein by reference in its entirety.

FIELD OF THE INVENTION

The present invention relates to the field of high-speed communication systems. More particularly, the invention relates to a method and system for seamlessly changing the match point of an MLSE detector, detecting a sequence of symbols, passing a communication channel, without disrupting the continuity of the output symbol stream.

BACKGROUND OF THE INVENTION

Maximum Likelihood Sequence Estimation (MLSE) is a mathematical algorithm to extract useful data out of a noisy data stream. An optimized detector for digital signals should do a best estimation of the transmitted data with the least possible number of errors, where the receiver emulates the distorted channel. All possible transmitted data streams are fed into this distorted channel model. The receiver compares the time response with the actual received signal and determines the most likely signal. In cases that are most computationally straightforward, root mean square deviation can be used as the decision criterion for the lowest error probability.

In Maximum Likelihood Sequence Estimation (MLSE), each sample of the received signal is associated with a sequence of symbols with respect to the (clock) phase of the sample within a received symbol. For example, a sample may be associated with a sequence of 5 decoded symbols, which may be the last 5 symbols that have been received, or the last 4 decoded symbols that have been received+the current decoded symbol.

The selection of which sample best represents the probability for each sequence of N consequent symbols has high impact on the achieved performance and hence called "match point selection".

Mathematically, a match point D can be defined using the following equation for describing the probability metric used for MLSE decoder, defined by Eq. 1. The selection of D is the match point. In this case, the decision metrics is actually the estimated probability per symbol (Prob{ }).

$$\text{metric}[\text{symbol}(i)] = (\text{Prob}\{[\text{symbol}(i)|\text{sample}(i-D), \text{decoded\_symbols}(i-D-1, \ldots, i-D-N)]\} \quad [\text{Eq. 1}]$$

where N is the number of consequent symbols that are assumed as ISA for decoding process and | denotes "given".

However, while making a continuous estimation, a current optimal match point may change due to changes of channel frequency response, such as changes that may occur as a result of temperature changes. This means that there is a match point with better performance.

It is therefore an object of the present invention to provide a system and method for seamlessly changing the match point of an MLSE detector, detecting a sequence of symbols passing a communication channel, without disrupting the continuity of the output symbol stream.

It is another object of the present invention to provide a system and method for seamlessly changing the match point of an MLSE detector, detecting a sequence of symbols passing a communication channel, without adding errors to the decoded symbols.

Other objects and advantages of the invention will become apparent as the description proceeds.

SUMMARY OF THE INVENTION

The present invention is directed to a method for providing seamless match point switching in an adaptive decoder (e.g., an MLSE decoder) that is based on estimation of symbol sequences, according to which statistics regarding samples corresponding to different symbol sequences in alternative match points are collected by a statistics collector and without disrupting the decoding process, for creating a set of figures of merit representing the quality of each alternative match point, while different match points are obtained by changing the delay of symbols decoded by the adaptive decoder and samples entering the statistics collector. A figure of merit of the current match point is compared to the figure of merit of alternative match points. Whenever an alternative match point figure of merit is better than the current match point by a predefined threshold, a decision is made to switch to the alternative match point. Upon decision to switch to the alternative match point, seamless switching to the alternative match point is performed by shifting the sampling phase forward or backward, compared to the current sampling phase by predetermined increments, until obtaining better performance, while performing adaptation of the decoder to the sampling phase shift.

Seamless switching to an alternative match point may be performed using analog or digital methods by changing the sampling phase of the input samples step-by-step, while after each step, continuing the adaptation process, to slowly and seamlessly change the decision metrics to the new match point.

The figure of merit may be based on collection of the variance of the samples for all or some of the symbol sequences, or on error estimation.

Alternative decoded symbol sequences may be moved by hops of positive or negative integer number of UIs or by delaying either the collected symbols or the collected samples to the data collection mechanism.

The collection process may be performed periodically, without changing the decision metrics within the decoder.

The present invention is also directed to a system for providing seamless match point switching in an adaptive decoder that is based on estimation of symbol sequences, which comprises:

a) an adaptive decoder which receives samples and converts them to symbols;
b) a first variable delay element which introduces a desired delay to the decoded symbols;
c) a second variable delay element which introduces a desired delay to the received samples;
d) a serial to parallel processing circuitry for receiving the stream of delayed symbols and generating a set of N consequent symbols, each of which with a different delay;
e) a statistics collector for periodically collecting, without disrupting the decoding process, statistics regarding samples corresponding to different symbol sequences in alternative match points corresponding to the set of N consequent delayed symbols and the delayed samples, and for creating a set of figures of merit representing the quality of current and alternative match points, while different match points are obtained by changing the delay of symbols decoded by the adaptive decoder and samples entering the statistics collector;

f) a decision circuit that performs symbol sequences estimation by comparing a figure of merit of the current match point to a figure of merit of alternative match points, and for performing a decision regarding match point switching, whenever the alternative match point figure of merit is better than the current one by a predefined threshold; and g) circuitry for switching to an alternative match point upon decision, by iteratively changing the sampling phase of the input samples by less than a predetermined threshold, until reaching the alternative match point, while performing adaptation of the decoder to the sampling phase shift.

Preferably, the statistics collection process is performed while keeping the decision metrics within the decoder. The signal statistics collected by the statistics collector may be based on symbol decoding and collection of moments or on histograms collected for each symbol sequence of N consequent symbols.

The sampling rate may be 1 Sample per Symbol (1 SPS), where each symbol is samples once.

The figure of merit may be based on collection of the variance of the samples for all, or some of the symbol sequences, or on error estimation.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention proposes a system and method for seamlessly changing the match point of an MLSE detector, detecting a sequence of symbols, passing a communication channel, without disrupting the continuity of the output symbol stream and without adding errors to the decoded symbols.

According to the proposed method, statistics regarding samples corresponding to different symbol sequences in alternative match points are collected by a statistics collector and without disrupting the decoding process, in order to create a set of figures of merit representing the quality of each alternative match point, while different match points are obtained by changing the delay of symbols decoded by the adaptive decoder and samples entering the statistics collector. A figure of merit of the current match point is compared to the figure of merit of alternative match points. Whenever an alternative match point figure of merit is better than the current match point by a predefined threshold, a decision is made to switch to the alternative match point. Upon decision to switch to the alternative match point, seamless switching to the alternative match point is performed by shifting the sampling phase forward or backward, compared to the current sampling phase by predetermined increments, until obtaining better performance, while performing adaptation of the decoder to the sampling phase shift.

Generally, the method proposed by the present invention includes the following stages:

Stage 1: seeking an alternative match point by collecting statistical information without disrupting the decoding process. This is achieved by changing the delay of one of the inputs of the channel's statistic collector.

Stage 2: Decision whether or not to switch to another match point, according to finding (or not finding) a new match point with better performance.

Stage 3: Upon decision, seamlessly switching to the alternative match point. This is achieved by changing the signal phase in small steps until the new match point phase is achieved.

For each adaptation stage of the MLSE, a model is built, based on current sampled signal and decoded symbols. This model is used to build the set of MLSE decision metrics for the next adaptation cycle. The model can be histogram collection per symbol sequence (i.e. collect how many times the sample X has been found together with each specific sequence of N symbols), moment collection (collect the average and optionally variance of samples per symbol sequence) or any other method of collecting actual samples, based on decoded or known (e.g. preamble) symbol sequences.

In order to collect the information to build the model, the system matches inputs samples to decoded symbol sequences that best describes each sample.

Collecting Information about an Alternative Match Point (Stage 1)

Figure 1:
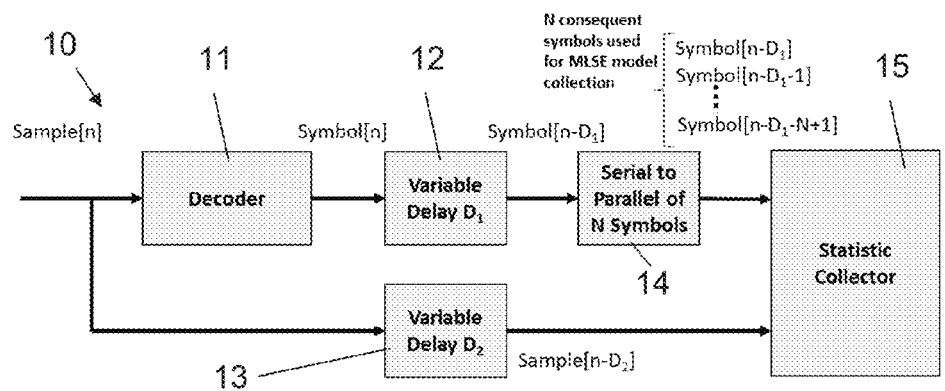
FIG. 1 shows an apparatus for collection of data for channel model for current and for alternative match point.

FIG. 1 shows an apparatus for collection of data for channel model for current and for alternative match point. During this stage, the MLSE collection mechanism must collect the information to build the model, using alternative decoded symbol sequences, moved by hops of positive or negative integer number of Unit Intervals (UIs, where each UI represents the symbol duration). This can be done by delaying either the collected symbols or the collected samples to the data collection mechanism.

The apparatus 10 comprises a decoder 11 which receives samples (e.g., Sample [n]) and converts them to symbols (Symbol [n]). The decoded symbols (Symbol [n]) enter a variable delay element 12 which introduces a delay of $D_1$, such that the output of the variable delay element 12 is Symbol $[n-D_1]$. The received samples (Sample [n]) enter a variable delay element 13 which introduces a delay of $D_2$, such that the output of the variable delay element 13 is Sample $[n-D_2]$. A serial to parallel processing circuitry 14 receives the stream of symbols and generates a set of N (=0, . . . , N-1) consequent symbols:

Symbol$[n-D_1]$
Symbol$[n-D_1-1]$
Symbol$[n-D_1-N+1]$,
each of which with a different delay $D_i$.

The statistics collector 15 collects data related to these N consequent symbols and one sample that best matches this sequence. By changing the delays $D_1$ and/or $D_2$, the statistics collector 15 can receive an input with delay to either the symbol sequence or the received samples. This way, it is possible to collect statistics for alternative match points.

By adding a delay of +K to $D_1$ or −K to $D_2$, the match point can be moved by K samples in one direction. Similarly, by adding −K to $D_1$ or +K to $D_2$, the match point can be moved by K samples to the other direction.

The statistics collection process is performed by the statistics collector 15 periodically, and does not change the decision metrics within the decoder 11. As a result, the apparatus 10 can collect match point statistics in parallel to its normal decoding process, without disrupting its output (Symbol[n]).

The signal statistics collected by the statistics collector 15 are based on symbol decoding and collection of moments (Method of Moments—a method of estimation of population parameters by collecting the average and optionally the variance of samples per symbol sequence) or histograms for each symbol sequence of N consequent symbols. This is done preferably in a sampling rate of 1 Sample per Symbol (1 SPS), where each symbol is samples once. However, due to Inter Symbol Interference, each symbol may be affected by preceding symbols and therefore, statistics collection is made for a sequence of N consequent symbols which are sampled once.

For example, if a histogram method is used, the statistics collector 15 collects data about different values of the same sample. For example, if the bit stream is "0,0,0,0", a histogram may indicate that the sample of this bit stream got 4 times the value 4, 80 times the value 5, 50 times the value 7 and so forth. This way, the statistics collector 15 generates a distribution function over all cases (for example, 100 cases) and the MLSE used this distribution function to represent the current state of the communication channel. This allows obtaining an indication regarding performance when sampling is made with a phase-shift of 1 sample (i.e., a shift of 27c forward or backward), compared to the current sampling, so as to seek better performance.

Decision for Match Point Switching (Stage 2)

The decision for match point switching is based on comparing a figure of merit of the current match point to the one of alternative match points. In case the alternative match point figure of merit is better than the current one by a predefined threshold, the system will decide of match point switching.

An example figure of merit can be based on collection of the variance of the samples for all, or some of the symbol sequences. A match point with lower average variance is expected to have better performance. Other figure of merit for selecting a match point can be based on error estimation. During statistics collection, it is preferable not to include edge symbols, since they may be truncated.

Seamless Switch to the Alternative Match Point Upon Decision (Stage 3)

Upon taking a decision to change match point, the system changes the sampling phase of the input samples. The sampling phase should be done step-by-step, and after each step the system will continue the adaptation process in order to slowly and seamlessly change the decision metrics to the new match point.

Figure 2:
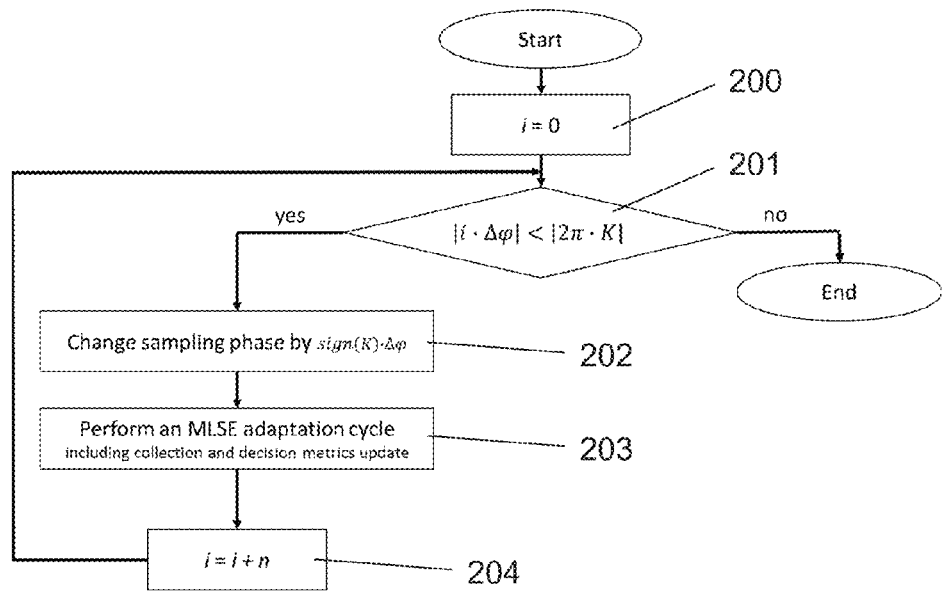
FIG. 2 is a flowchart of the process of changing match point by K samples, according to an embodiment of the invention.

FIG. 2 is a flowchart of the process of changing match point by K samples, according to an embodiment of the invention. The sampling phase changes in small increments of $|i\Delta\Phi|$, until the new match point is achieved, according to the following steps:

At the first step 200, the sample index i is set to be 0. At the next step 201, the sample index i is set to be 1 and the system checks if the phase change is sufficiently small to fulfill the condition:

$$|i\Delta\Phi|<|2\pi K|$$

If this condition is not fulfilled, the increment is not sufficiently small to assure continuity of the output symbol stream and the process ends. If it is fulfilled, at the next step 202 the current sampling phase is changed by sign(K)·ΔΦ. At the next step 203 the system performs an MLSE adaptation cycle, which includes updating the statistics collection and the metrics. At the next step 204 the sample index i is set to be i+1 and step 201 is repeated to check whether or not the condition $|(i+1)\Delta\Phi|<|2\pi K|$ is fulfilled and so forth.

Changing of the sampling phase can be achieved in different known methods (which may be analog or digital), depending on the system architecture.

Figure 3A:
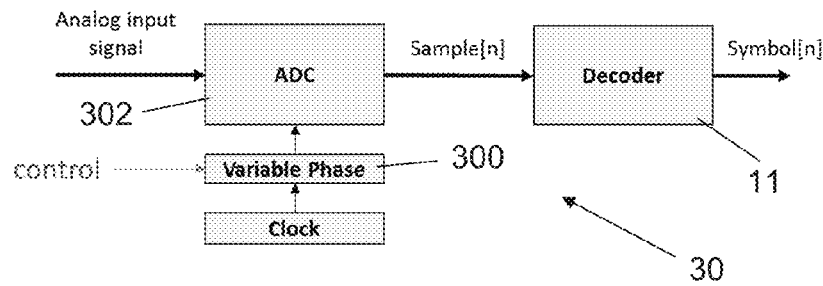
FIG. 3a shows an analog circuit, which uses a variable filter on the clock path.

FIG. 3a shows an analog circuit 30, which uses a variable filter 300 on the clock path. Variable filter 300 is controlled by a control input to shift the phase of the clock signal to a desired value. This value is input into the ADC 302, which receives the analog input signal and samples it at the appropriate phase according to the control input, to produce Sample[n] which is decoded by the decoder 11, to produce the corresponding output Symbol[n].

Figure 3B:
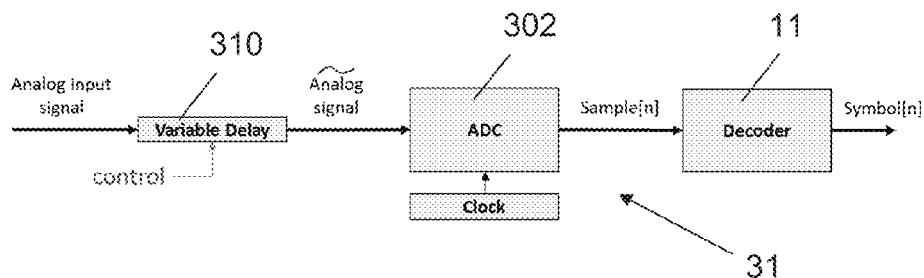
FIG. 3b shows another analog circuit 31, which uses a variable delay element 310 on the analog data path.

FIG. 3b shows another analog circuit 31, which uses a variable delay element 310 on the analog data path. Variable delay element 310 is controlled by a control input to shift the phase of the analog input signal to a desired value, to thereby create a phased-shifted analog input signal, to be sampled. The ADC 302 receives the phased-shifted analog input signal and samples it, to produce Sample[n] which is decoded by the decoder 11, to produce the corresponding output Symbol [n].

Figure 3C:
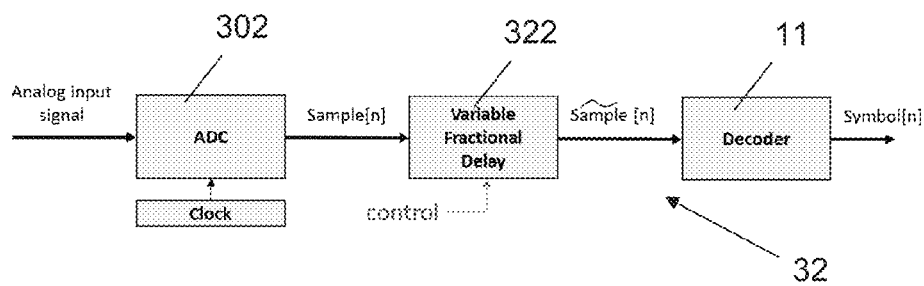
FIG. 3c shows a digital circuit, which uses a variable delay element on the digital data path.

FIG. 3c shows a digital circuit 32, which uses a variable delay element 310 on the digital data path (i.e., on the samples). The ADC 302 receives the analog input signal and samples it at the clock rate, to produce Sample[n]. Variable fractional delay element 322 is controlled by a control input to introduce a desired delay to the samples Sample[n], to thereby create corresponding delayed samples Sample[n], which are decoded by the decoder 11, to produce the corresponding output Symbol[n].

By performing MLSE adaptation during the change of sampling phase, the system assures seamless output symbol stream continuity during the match point switching. The small phase steps assure that the channel does not change much between iteration of the loop and that the Bit Error Rate (BER) is kept continuous and low during the switching process.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for providing match point switching in an adaptive decoder that is based on estimation of symbol sequences, comprising:

a) collecting by a statistics collector and without disrupting a decoding process of the adaptive decoder, statistics regarding samples corresponding to different symbol sequences in alternative match points, for creating a set of figures of merit representing a quality of each alternative match point, while different match points are obtained by changing the delay of symbols decoded by said adaptive decoder and samples entering said statistics collector;
b) comparing a figure of merit of a current optimal match point to the figures of merit of alternative match points;
c) whenever a figure of merit of one of the alternative match points is better than the current optimal match point by a predefined threshold, deciding to switch to said one alternative match point; and
d) upon decision to switch to said one alternative match point, switching to said one alternative match point by shifting a sampling phase forward or backward, compared to a current sampling phase by predetermined increments, until obtaining better performance, while performing adaptation of said adaptive decoder to the sampling phase shift.

2. The method according to claim 1, wherein the sampling phase shift is done step-by-step, while after each step, continuing the adaptation of the adaptive decoder, to slowly change decision metrics of the adaptive decoder to a new match point.

3. The method according to claim 1, wherein the sampling phase is changed using analog or digital methods.

4. The method according to claim 1, wherein the figures of merit of alternative match points is based on collection of a variance of the samples for all or some of the symbol sequences, or on error estimation.

5. The method according to claim 1, wherein alternative decoded symbol sequences are moved by delaying either collected symbols or collected samples entering the statistics collector.

6. The method according to claim 1, wherein the collecting step is performed periodically, without changing decision metrics within the adaptive decoder.

7. The method according to claim 1, wherein the adaptive decoder is a Maximum Likelihood Sequence Estimation (MLSE) decoder.

8. A system for providing match point switching in an adaptive decoder that is based on estimation of symbol sequences, comprising:
a) an adaptive decoder which receives samples and decodes the received samples to produce decoded symbols;
b) a first variable delay element which introduces a desired delay to the decoded symbols;
c) a second variable delay element which introduces a desired delay to the received samples;
d) a serial to parallel processing circuitry for receiving a stream of the delayed symbols and generating a set of (N) consequent symbols, each with a different delay, N being a non-zero positive integer;
e) a statistics collector for performing a statistics collection process that includes periodically collecting, without disrupting the decoding of the adaptive decoder, statistics regarding samples corresponding to different symbol sequences in alternative match points corresponding to the set of N consequent delayed symbols and the delayed samples, and for creating a set of figures of merit representing the quality of current optimal and alternative match points, while different match points are obtained by changing the desired delay of symbols decoded by said adaptive decoder and samples entering said statistics collector;
f) a decision circuit that performs symbol sequences estimation by comparing the figure of merit of the current optimal match point to the figures of merit of alternative match points, and for performing a decision regarding match point switching, whenever a figure of merit of one of the alternative match points is better than the current optimal match point by a predefined threshold; and
g) circuitry for switching to said one alternative match point upon decision, by iteratively changing the sampling phase of input samples by less than a predetermined threshold, until reaching said one alternative match point, while performing adaptation of said adaptive decoder to the sampling phase shift.

9. The system according to claim 8, in which the statistics collection process is performed while keeping current decision metrics within the adaptive decoder and used for its normal decoding process.

10. The system according to claim 8, in which the statistics collected by the statistics collector are based on symbol decoding and collection of moments.

11. The system according to claim 8, in which the statistics collected by the statistics collector are based on histograms collected for each symbol sequence of N consequent symbols.

12. The system according to claim 8, in which a sampling rate of the symbols is 1 Sample per Symbol (1 SPS), where each symbol is sampled once.

13. The system according to claim 8, in which the figures of merit of alternative match points is based on collection of a variance of the samples for all, or some of the symbol sequences.

14. The system according to claim 8, in which the decision to switch to the figure of merit of said one alternative match point is based on error estimation.

15. The system according to claim 8, in which the adaptive decoder is a Maximum Likelihood Sequence Estimation (MLSE) decoder.

* * * * *